United States Patent [19]

Kunst et al.

[11] 3,774,553
[45] Nov. 27, 1973

[54] RAILWAY PASSENGER VEHICLE SIDE PLATE CONSTRUCTION

[75] Inventors: Robert J. Kunst, Chicago, Thomas J. O'Neill, Evergreen Park, both of Ill.; Norman M. Szala, Hammond, Ind.

[73] Assignee: Pullman Incorporated, Chicago, Ill.

[22] Filed: Nov. 1, 1971

[21] Appl. No.: 194,215

[52] U.S. Cl. .................................. 105/401, 105/409
[51] Int. Cl. .......................................... B61d 17/08
[58] Field of Search ................... 105/401, 396, 397, 105/329, 409; 52/56, 51, 45, 47

[56] References Cited
UNITED STATES PATENTS

| | | | |
|---|---|---|---|
| 2,851,965 | 9/1958 | Leriche | 105/409 |
| 3,461,819 | 8/1969 | Eggert, Jr. | 105/401 |
| 3,442,225 | 5/1969 | Larssen | 105/409 |

*Primary Examiner*—Gerald M. Forlenza
*Assistant Examiner*—Richard A. Bertsch
*Attorney*—Hilmond O. Vogel et al.

[57] ABSTRACT

A side plate assembly including an extruded side plate member forming the top portion of the side wall unit and including flange portions receiving the roof assembly and also including integrally formed notched portions which receive reinforcing plate members to thereby form a rigid corner section at the junction of the side wall and roof units.

10 Claims, 8 Drawing Figures

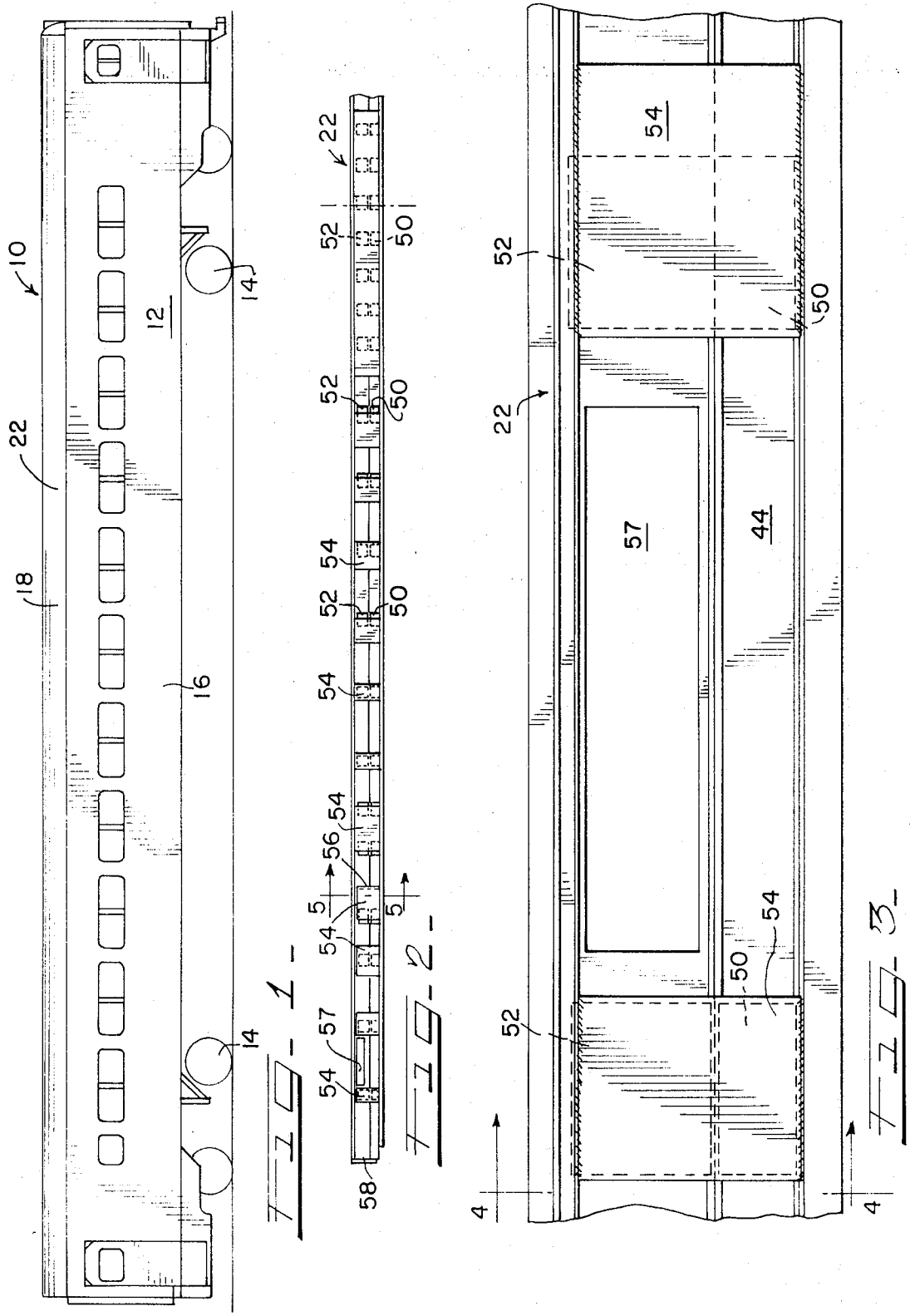

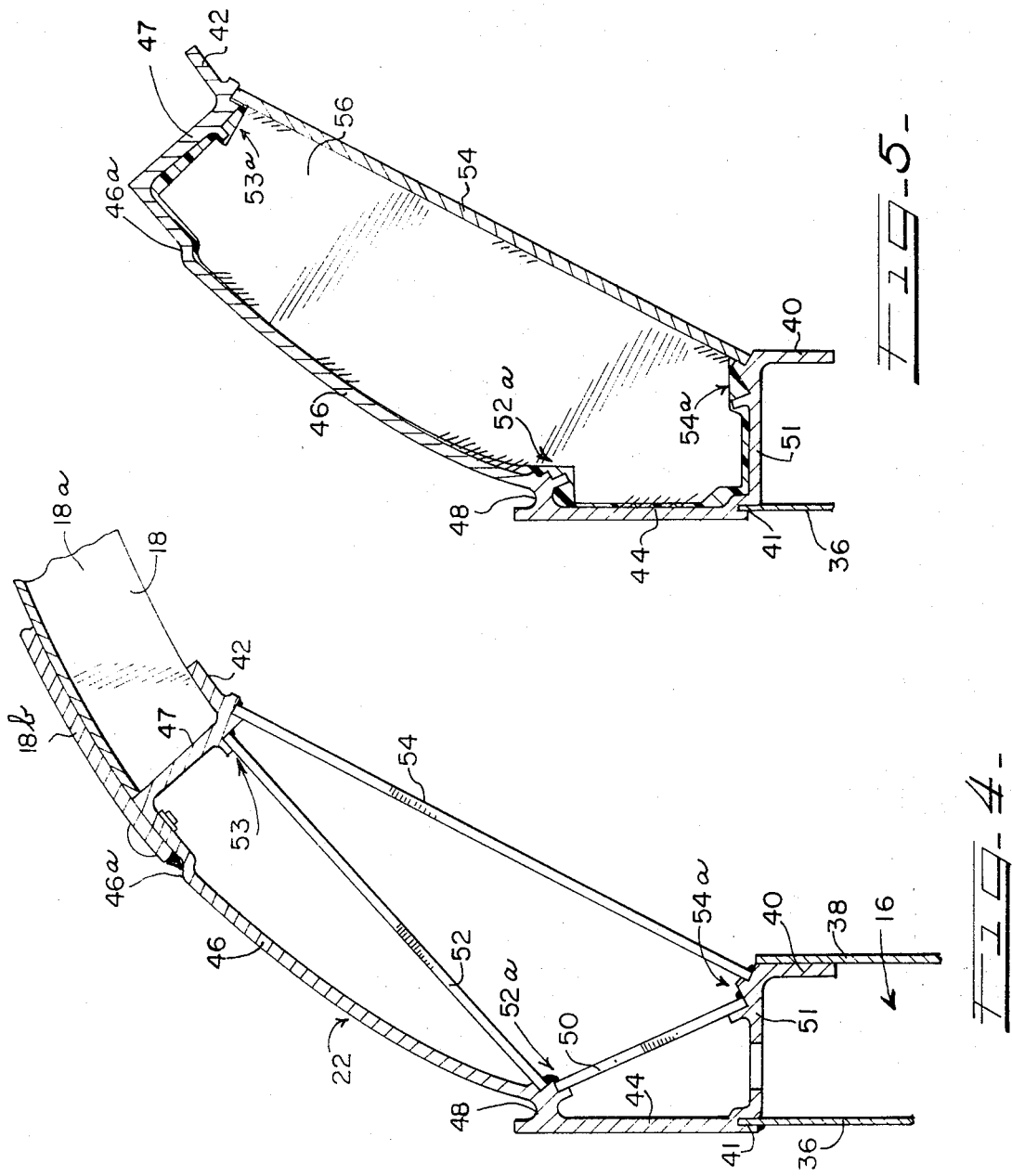

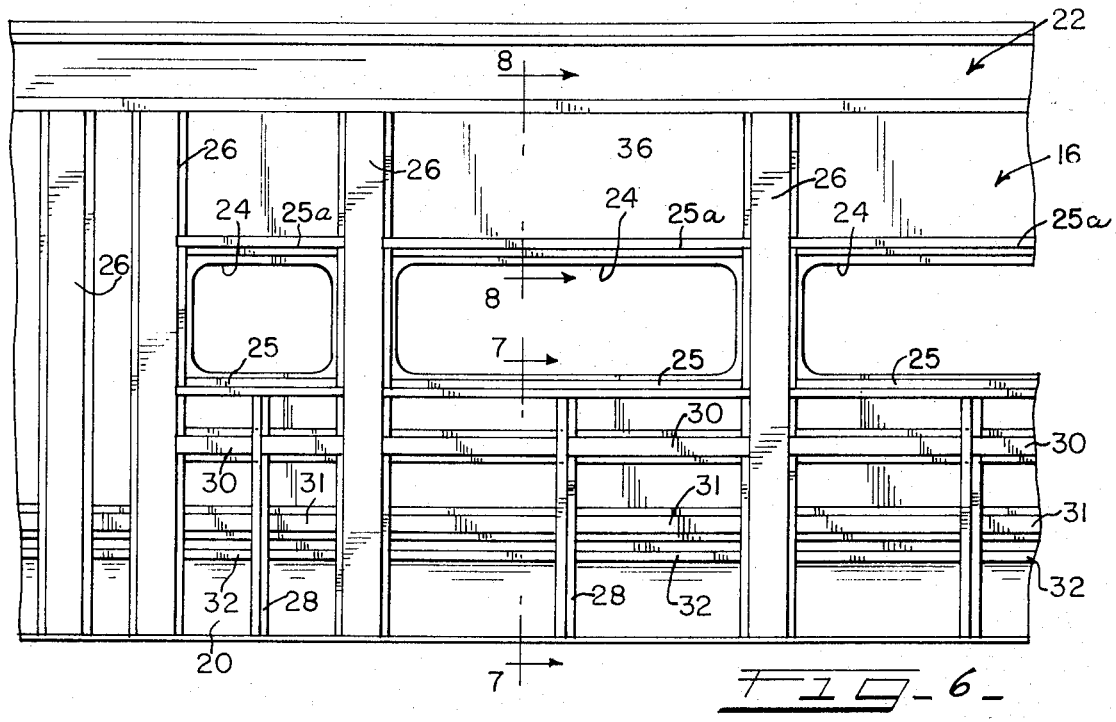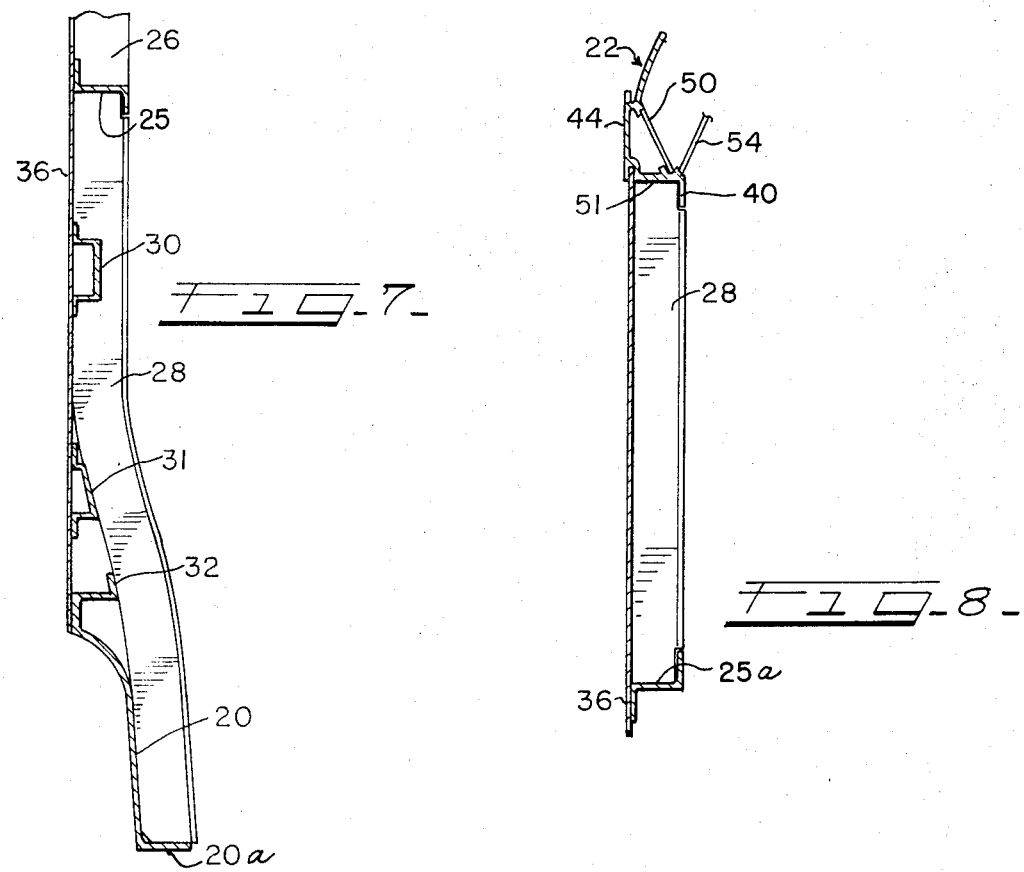

RAILWAY PASSENGER VEHICLE SIDE PLATE CONSTRUCTION

BACKGROUND OF THE INVENTION

1. Field of the invention:

This invention pertains to railway passenger vehicles and in particular to side plate construction located at the junction of the side wall and roof units.

2. Description of the prior art:

Prior art side plate members generally include a rigid beam-like member positioned on top of the side wall unit and functioning for attachment of the roof unit and to prevent bulging of the upper portion of the side wall unit. An undesirable feature of prior art side plate units was the necessity of welding additional plates to the side wall to allow for attachment of the roof unit. An additional undesirable feature was the necessity for a large number of rivets and bolts to secure the assembly and provide a smooth transition between the roof sheet and the side sheet of the side wall since the typical side plate was an internal member. The present invention utilizes an extruded member having a number of integrally formed flange portions used for attachment between the side wall and roof units. By using an extruded member as the basic side plate the flange portions are easily fabricated and by including notched portions internally of the extruded side plate additional reinforcing plates may be easily welded into position to provide the structural strength necessary in this corner between the roof and side walls. Also, the extruded side plate may have an arcuate portion forming an external member joining roof sheets with the side wall unit.

SUMMARY OF THE INVENTION

The present invention relates to the side plate for the corner member positioned at the junction of the roof unit and side wall unit. The embodiment includes an extruded side plate member having attachment flange portions for receiving the side wall and roof units and also including an arcuate portion forming a continuation of the roof surface. Reinforcing plate members positioned internally of the extruded side plate provide structural rigidity to the side plate unit and form a sound connection between the roof and side wall.

It is an object of the present invention to provide an extruded side plate member for a railway passenger vehicle which forms a smooth transition piece between the roof and side wall units.

It is another object of the present invention to provide a side plate having depending flange portions for attachment to facilitate attachment of the roof unit to the side wall unit of a railway passenger vehicle.

Additionally it is an object of the present invention to provide a side plate member which forms an external part of the passenger vehicle and includes internally positioned reinforcing plate members which may be welded into positon upon assembly of the roof unit onto the side wall unit.

These and other objects of the invention will become apparent from reference to the following description, appended claims and attached drawings.

BRIEF DESCRIPTION OF THE DRAWINGS

FIG. 1 is a side elevational view of a railway passenger vehicle;

FIG. 2 is a side view of the side plate of the present invention as viewed from the interior of the passenger vehicle;

FIG. 3 is an enlarged portion of the side plate illustrated in FIG. 2;

FIG. 4 is an enlarged sectional view taken along line 4—4 of FIG. 3;

FIG. 5 is an enlarged sectional view taken along line 5—5 of FIG. 2;

FIG. 6 is a side elevational view of a portion of the car wall unit as viewed from the interior of the passenger vehicle with the inside wall sheets removed;

FIG. 7 is an enlarged sectional view taken along line 7—7 of FIG. 6; and

FIG. 8 is an enlarged sectional view taken along line 8—8 of FIG. 6.

DESCRIPTION OF THE PREFERRED EMBODIMENT

In FIG. 1 there is illustrated a typical passenger vehicle 10 having a passenger supporting body unit 12 supported on spaced wheel truck members 14. The body 12 includes the usual spaced side wall units 16 and a top or roof unit 18 extending above and connecting the spaced side wall units. The roof unit 18 includes a series of transversely extended and longitudinally spaced roof post members 18a which are covered by the roof sheet 18b. The side wall unit includes a lower portion having a side sill 20 fixedly connected thereon with the side sill 20 having a bottom flange 20a. The top or upper portion of the side wall unit 16 includes a side plate 22 which is essentially the top structural member which extends the length of the side wall unit to provide rigidity and prevent bowing or twisting of the side wall unit. This side plate 22 also functions to form a point of connection between the side wall unit 16 and the roof unit 18.

The side wall unit 16 includes a plurality of spaced window openings 24 having framing sash members 25, 25a and a series of vertically extending hat shaped wall post members 26. A series of shorter wall posts 28 are positioned below the window openings 24 to provide structural support in this area. Extending between the vertically extending wall posts are a series of horizontally extending reinforcing posts 30 and 31 such as illustrated in FIGS. 6 and 7. As noticed in FIG. 7 the side sill 20 includes an attachment flange portion 32 extending outwardly of the wall post 28 and attached to the outer skin 36. An inner wall skin 38 as illustrated in FIG. 4 is positioned on the interior portion of the car wall posts and is generally a thin sheet member and may be either a plastic or a metalic material.

The side plate construction involved with the present invention and as best illustrated in FIG. 4 is an extruded member having a depending downwardly extending flange portion 40 abutting the inner skin 38 and providing a mounting and attachment surface therefor. Spaced outwardly of the vehicle and included in the side plate is a longitudinally extending and slot portion 41 for receiving the outer skin 36 and for attachment of the same. The upper portion of the side plate 22 includes a generally upwardly and inwardly extending roof receiving flange portion 42. Thus it is noticed that the side plate includes a plurality of flange portions 40, 42 and a slot portion 41 for attachment between the side wall unit 16 and the roof unit 18.

Extending upwardly from the slot 41 is a vertical wall portion 44 forming essentially a continuation of the side sheet or outer skin 36. An arcuate wall or body portion 46 extends generally from the top portion of the wall 44 inwardly and upwardly of the side wall unit 16 and includes a stepped portion 46a at its upper end which receives the roof sheet 18b and thereby permits a smooth transition between the roof unit 18 and the side plate 22. Wall portion 47 abuts the roof posts 18a. A gutter portion 48 is positioned at the lower end of the arcuate body portion 46 to direct water toward the end of the vehicle.

It should be pointed out at this time that the portions of the side plate just described are all integrally formed as a unit and extruded from a light weight material such as aluminum.

Positioned internally of the side plate 22 is a reinforcing plate 50 extending diagonally between the junction of the bottom wall 51 and the flange portion 40 to the notched portion 52a which is at the junction of the arcuate outer portion 46 and the vertical wall portion 44. A second reinforcing plate portion 52 extends upwardly and inwardly from the notched portion 52a to another notched portion of the side plate designated by the numeral 53a which includes a plurality of spaced wall portions which define slots for receipt of reinforcing plates which are positioned therein and then welded for permanent attachment. Extending upwardly and inwardly from the bottom wall 51 is a third reinforcing plate 54 which is mounted in notched portion 54a and closes a reinforcing triangle composed of the reinforcing plates 50, 52 and 54.

It is noticed from FIGS. 2 and 3 that these reinforcing plate members are not continuous but short plate portions spaced along the length of side plates to provide reinforcement. The reinforcing plates 52 and 54 combine with the arcuate portion 46 of the extruded side plate 22 to form continuations of the roof posts 18a and thereby provide a structural member which continues into the side wall unit to form a strong corner at the upper portion of the passenger vehicle. The plate portion 50 closes off the reinforcing triangle and adds to the plates 52 and 54 the inherent structural strength of a triangular reinforcing beam member which has characteristicly desirable strength in compression, tension, and in resisting torsional and bending loading such as is present at the side plate in a railway vehicle.

As illustrated in FIG. 5 a close up plate 56 may be positioned within the side plate 22 and in referring to FIG. 2 also it is noticed that this close up plate 56 is used in conjunction with the air intake duct 57 and the end close up 58 to form an air type plenum chamber in this area of the side plate.

THE OPERATION

Thus it is noticed from the foregoing explanation and description that the side plate construction of the present invention permits the flexibility of an extrusion to be combined with the reinforcing strength of plate members to provide a side plate unit which is functional and which may be adapted to a multiplicity of applications and yet possess enough strength to satisfy the structural requirements of a side plate which undergoes a variety of loading forces. By having the external member comprising a continuous extruded member the reinforcing members may be spaced along the interior of the vehicle and thereby permit access to the inside of the side plate 22 to allow running electrical wires through this area of the side plate.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railway passenger vehicle having spaced side wall units supporting a roof unit, a side plate positioned at the junction of each side wall unit and the roof unit and including:
   a side wall unit attachment portion depending from the side plate to receive said associated side wall unit;
   roof unit attachment means spaced vertically from the side wall unit attachment portion;
   a side plate body portion extending between the side wall unit connecting portion and the roof unit connecting means;
   plate mounting means positioned within the side plate;
   reinforcing plate members being fastened on associated plate mounting means and including a first plate extending from the roof attachment means and wall unit attachment portion of the side plate thereby combining with the side plate body portion to form an enclosed hollow beam portion.

2. The invention according to claim 1, and:
   said side plate body portion including said an integrally formed gutter means.

3. The invention according to claim 1, and:
   said roof unit having sheet means forming the outer surface thereof;
   roof post members extending transversely of the vehicle and supporting said sheet means;
   a stepped portion in the side plate receiving the sheet means to form a continuous smooth roof surface.

4. The invention according to Claim 1, and:
   said reinforcing plate members including said first plate and a second plate extending downwardly and divergingly from a common apex at the roof unit.

5. The invention according to claim 4, and:
   third plate portion connecting said first and second plates to form a side plate reinforcing triangle structure.

6. The invention according to claim 4, and:
   said first and said second reinforcing plates being noncontinuous members spaced along the length of the side plate.

7. In a vehicle having a pair of spaced side wall units and a roof unit, a side wall construction including outer wall means, vertical and horizontal framing members attached to the outer wall means, window openings in the wall means between certain of said framing members, a continuous side plate forming the top portion of the side wall unit and including:
   a roof unit attaching portion including a roof supporting flange and an associated wall portion abutting said roof unit thereby forming a roof unit receiving means;
   side wall attaching portions including a flange portion and an outer wall receiving seam means;

a wall portion forming a continuation of the roof and wall units and extending between the roof unit attaching portions and the side wall attaching portions;

reinforcing plate means attached within the side plate and including at least one plate member connecting both the roof unit attaching portion and said side wall attaching portions thereby forming a reinforced side plate beam means.

8. The invention according to claim 7, and:
said side plate being a car length continuous extruded member formed of aluminum alloy and having an integrally formed gutter portion.

9. The invention according to claim 7, and:
said side plate having reinforcing plate mounting portions including plate receiving portions for positioning and attaching of the reinforcing plate means.

10. The invention according to claim 7, and:
said reinforcing plate means including first, second, and third plate members forming a reinforcing triangular beam within the side plate.

* * * * *